UNITED STATES PATENT OFFICE.

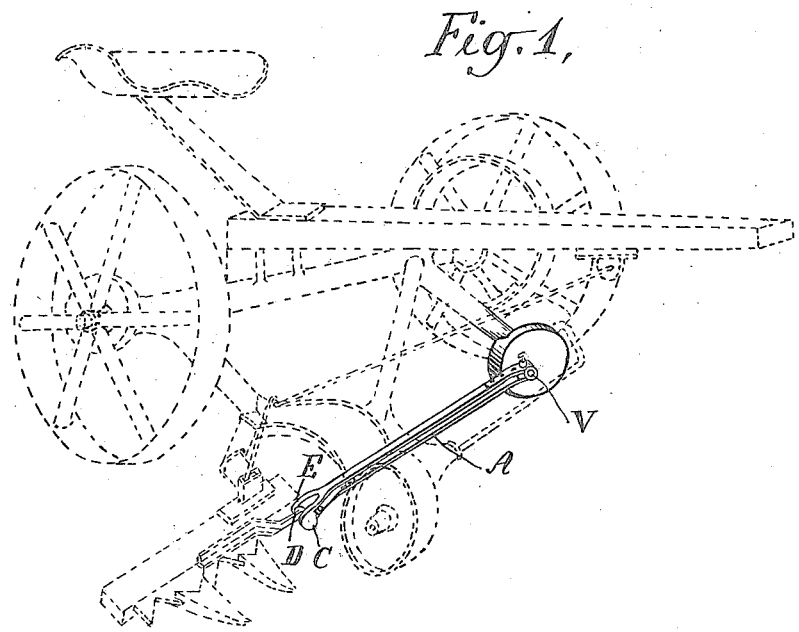
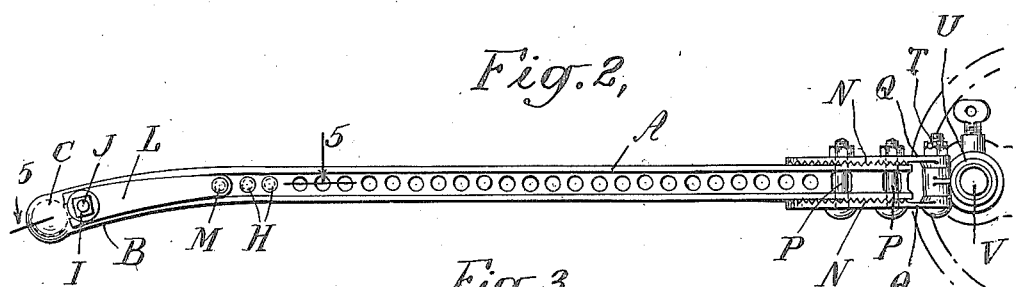
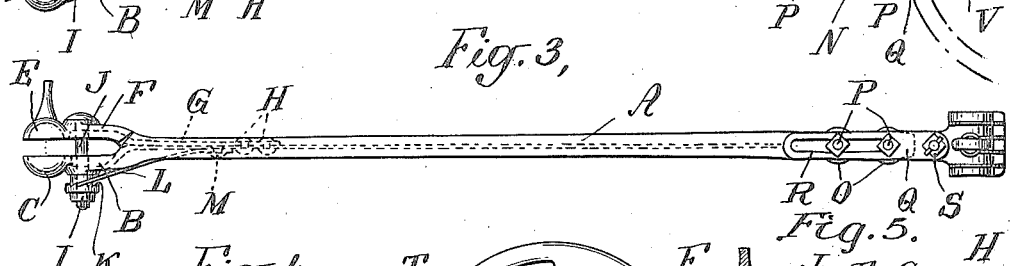
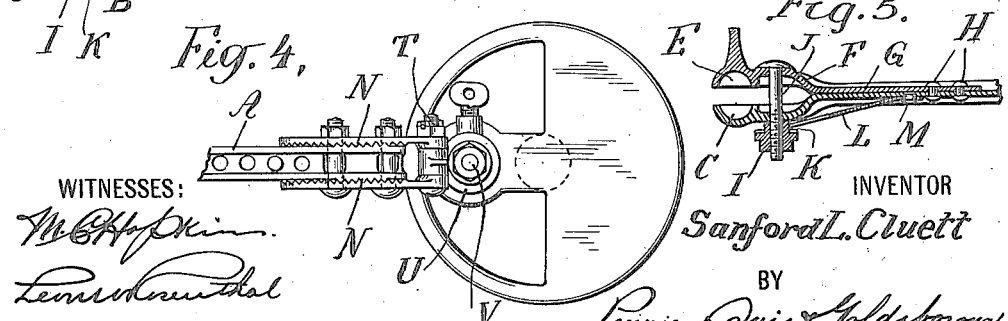
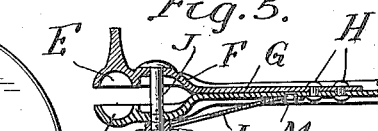

SANFORD L. CLUETT, OF HOOSICK FALLS, NEW YORK.

MOWER-PITMAN.

1,196,524.

Specification of Letters Patent.

Patented Aug. 29, 1916.

Application filed May 14, 1912. Serial No. 697,144.

*To all whom it may concern:*

Be it known that I, SANFORD L. CLUETT, a citizen of the United States, residing at Hoosick Falls, county of Rensselaer, State of New York, have invented certain new and useful Improvements in Mower-Pitmen; and I do hereby declare the following to be a full, clear, and exact description of the invention, such as will enable others skilled in the art to which it appertains to make and use the same.

The present invention relates to agricultural machinery of the class including mowers and harvesting machines such as reapers and binders, and is particularly directed to the improvement of the structure of the pitman rod employed to reciprocate the knife or sickle from the balance wheel in such machines. Owing to the great number of reversals of this pitman and the knife driven by it, which must be effected in the operation of these machines, it is necessary, if economy in the expenditure of power is to be secured, that the pitman have great strength and rigidity as compared with its weight. Not only is the pitman subjected to severe alternate tension and compression strains but the transverse reversals of the pitman by the action of the driving crank at the ordinary speeds of operation exert an additional bending stress upon the material of the pitman rod which increases with its weight.

The economic conditions governing the cost of farm machinery precludes the employment of expensive structural innovations and it has long been sought to attain a strong and durable structure to fulfil, at moderate cost, the requirements of this element of the combination embraced within this class of manufacture.

It has been found that a solid bar of steel of a weight which would not absorb an amount of power above that permissible, would bend and receive a permanent set resulting in a mis-adjustment of the combined parts; while the employment of wood, having the required lightness and resiliency, presents difficulties in securing the metallic end connections to the wood in such a manner that they will not be loosened by the constant and violent vibration.

In the pitman herein presented, I have provided a light and rigid structure of a form which successfully resists the severe strains which it is called upon to withstand, the I-beam cross-section of the main reach with the web in the plane of rotation of the driving crank securing the required strength and rigidity, the sickle connection being integral with the main body-portion and the contact surfaces of the main body with the extension pieces adjacent the wrist pin bearing box being of material which is not subject to deformation under the influence of vibration, resulting in a markedly improved article of manufacture. This pitman may be made of cast iron and still withstand the severe conditions which are imposed upon it.

I have illustrated my improved pitman structure in the accompanying drawings, in which—

Figure 1 is a view in perspective of a mowing machine showing my improved pitman and the driving balance wheel in full lines, and the remainder of the machine in dotted lines; Fig. 2 is a side elevation of the pitman; Fig. 3 is a plan of the same; Fig. 4 is a detail, on a larger scale, of the extension end and journal box of the pitman; and Fig. 5 is a section on line 5—5 of Fig. 2.

Referring to the drawing, a main body portion A of I-beam cross-section, which merges into an offset portion B at one end and terminates at that end in a socket C, is adapted for engagement with a ball D upon the sickle. A clamp, which terminates in a complementary socket E, has an offset portion F, similar to B of the main body portion, and a thinner shank G which fits between the flanges of the I-beam portion of the main body and is riveted at H to the web. The shank G, though cast, is sufficiently flexible to permit of the separation of the sockets C and E for the insertion therebetween of the ball D and to permit said sockets to be adjusted to the ball D by a nut I on a bolt J passing through holes in the offsets B and F. The nut I is preferably provided with ratchet teeth K adapted to be engaged by a spring L riveted to the web of the main body portion at M to prevent the mis-adjustment of said nut. The opposite end of the pitman is provided with transverse ribs N upon the upper surface of the head, and the lower surface of the base of the I-beam body, and the head and base are extended laterally at O, O to admit of the provision of holes for bolts P, whereby extension pieces Q provided with transverse ribs similar to those at N are adjustably secured to the main body portion A. The extension pieces Q are provided with longitudinal slots R admitting of their being secured to the body at various points to increase or diminish the length of the pitman. Vertical holes S in the projecting ends of the extension pieces Q for the accommodation of the bolt T on the journal box U serve as a means for connecting the pitman to the box and allowing for lateral movements of the pitman relatively to the wrist pin V which operates it.

As the socket C is integral with the main body portion A of the pitman and as the ribs N on the main body portion A of the pitman and on the extension pieces Q are of the metal of these parts, and therefore, not subject to the deformation which would loosen a connection made between metal and wood, the pitman when assembled will not shake apart. The web of the main reach of the pitman being set in the plane of rotation of the driving crank, successfully resists the tendency to bend and assume a permanent set occasioned by the quick transverse reversal of the pitman when in operation. The I-beam construction admits of the reach being made lighter while still retaining great strength and rigidity. The web of the I-beam section may be pierced with a number of holes to lighten the pitman without materially lessening the strength of this part.

Having thus described my invention what I claim is:

1. A pitman comprising an integral metallic reach-member of I-beam cross-section, the rib of the I-beam extending from end to end of the reach-member, an integral offset extension for said reach-member having a ball-receiving socket formed therein, and a resilient clamp piece likewise offset from the reach-member and having a complementary ball-receiving socket disposed opposite said first-named socket, said clamp-piece being provided with a tongue fitting between the upper and lower flanges of the reach-member and secured thereto, and an adjustable locking bolt for exerting a tension upon the resilient clamp-piece; substantially as described.

2. A pitman, having a reach-member consisting of a metal bar of I-beam cross-section at the pitman end, said reach-member being provided with an offset integral extension provided with a clamping socket, and a coöperating flexible extension secured to the I-beam between its flanges and having a complementary socket, said extensions being separated by an intervening space to permit putting the flexible extension under tension, and a tension-exerting screw bolt for drawing the flexible extension toward the integral extension; substantially as described.

In testimony whereof I affix my signature, in presence of two witnesses.

SANFORD L. CLUETT.

Witnesses:
    DANFORTH GEER,
    ANDREW H. ALLEN.